May 6, 1958   E. J. ROBERTS ET AL   2,833,622
CATALYTIC TREATMENT OF ALUMINA IN FLUIDIZED BEDS
Filed Nov. 1, 1956
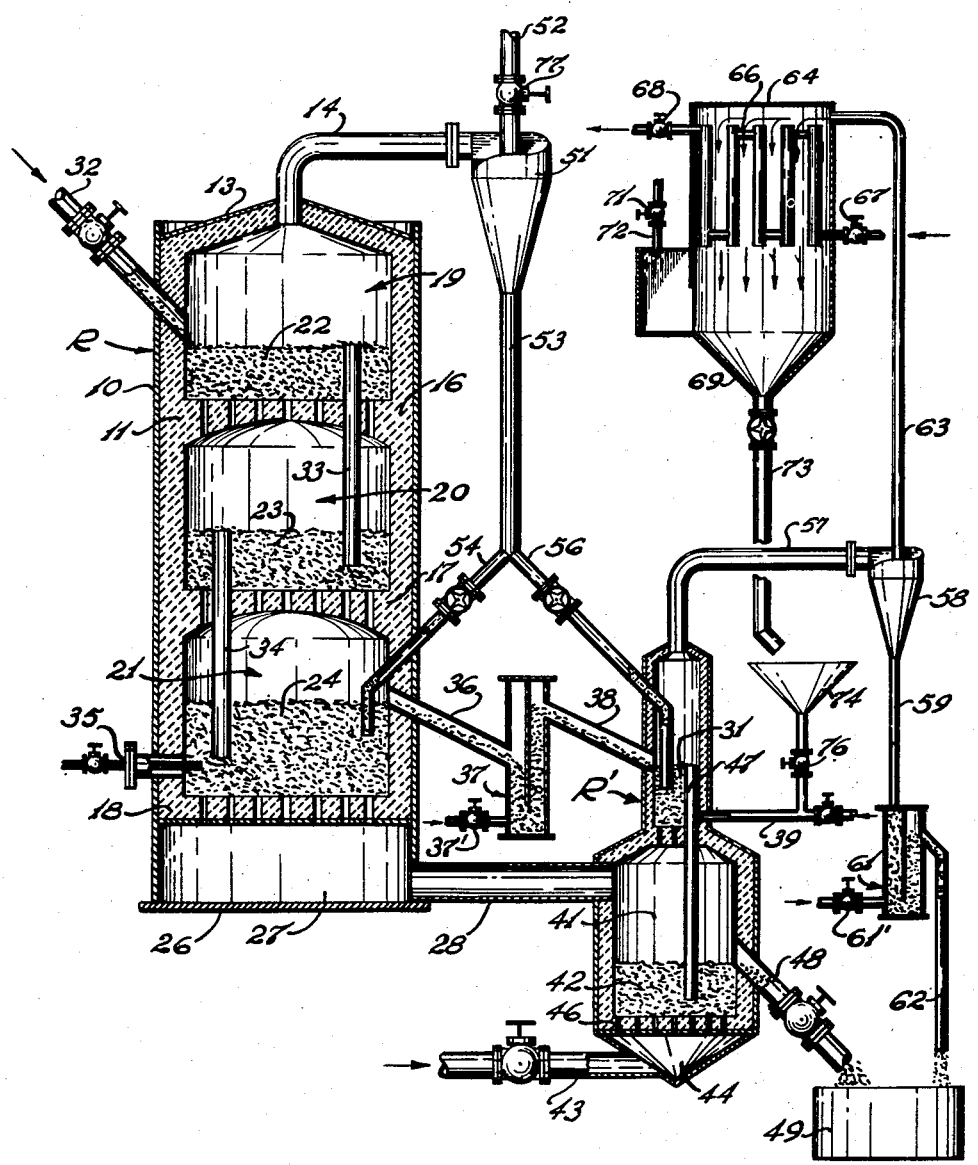
INVENTORS
WALFRED W. JUKKOLA
ELLIOTT J. ROBERTS
BY Robert R. Finch
Attorney

United States Patent Office 2,833,622
Patented May 6, 1958

2,833,622

CATALYTIC TREATMENT OF ALUMINA IN FLUIDIZED BEDS

Elliott J. Roberts and Walfred W. Jukkola, Westport, Conn., assignors to Dorr-Oliver Incorporated, Stamford, Conn., a corporation of Delaware Application November 1, 1956, Serial No. 619,718

2 Claims. (Cl. 23—142)

This invention relates generally to the calcining of alumina to convert it to a form for subsequent recovery of its aluminum content in accordance with established processes. More particularly, the invention relates to calcining finely divided alumina in accordance with the fluidizing technique in order to produce a calcined product of the so-called "alpha" form.

In the production of alumina the usual procedure is to first calcine an alumina hydrate to drive off the water of hydration and produce a non-hygroscopic alumina usually of the "gamma" form. The resulting calcined alumina is then subjected to an electrolytic reduction process in which aluminum metal is recovered by dissolving alumina calcine in molten cryolite which liberates aluminum and enables its recovery by specific gravity separation.

The above mentioned gamma form of alumina, which is also known as "sandy" alumina, creates a serious dusting problem when dumped onto the surface of the cryolite layer. It is known that such dusting can be overcome to a large degree if the alumina is converted to the so-called "alpha" or "flour" form alumina which has a different physical structure that is less prone to dusting. It is also known that alpha alumina can be produced by calcining for relatively long periods at temperatures in the range of 2200° F. to 2400° F. However, this is a rather costly calcining operation. It has recently been learned that the conversion of gamma alumina to alpha alumina is greatly facilitated by the presence of a catalyst, of which aluminum fluoride ($AlF_3$) is a well known example. Hence, there is now renewed interest in alpha alumina since the catalytic formation thereof appears to overcome the prior problem of lengthy calcination time. Thus, the present invention is directed to the calcination and catalytic conversion of alumina to yield the preferred alpha form and in particular the carrying out of such process in accordance with the solids fluidization technique to thereby take advantage of the known superior contacting efficiency of fluidized solids.

The fluidized solids technique may be briefly described as a method in which a mass of finely divided solids is suspended as a turbulently mobilized mass in an uprising gas stream. Such a suspension, which is referred to as a fluidized bed, is noted for its extreme efficiency of mixing and gas contact and has been highly successful in many operations, including the calcining alumina hydrates to produce gamma alumina. In such a process for producing gamma alumina, the usual procedure is to employ several fluidized beds through which alumina hydrate passes successively in countercurrent flow to an uprising gas stream. One of the beds is maintained as a combustion bed in which heat is generated by combustion of fuel to attain calcining temperature. Gases rising upwardly from such combustion bed pass through the fluidized beds thereabove (referred to as preheating beds) thus giving up some of their sensible heat to preheat incoming solids. Calcined solids discharging from the combustion or calcining bed are cooled in a separate fluidized bed (cooling bed) by action of the incoming fluidizing gas thus serving to preheat such gas before it enters the combustion bed. The above described countercurrent gas-solids flow is now an accepted fluidized solids operation primarily because passing of the gas stream successively through all fluidized beds enables maximum utilization of heat.

Although the above described process has heretofore been extremely successful in producing the gamma form of alumina it has not been all that is desired in producing alpha alumina. In fact, continuous operation of such a system to produce alpha alumina has heretofore been unsuccessful. The chief problem causing a lack of success in producing alpha alumina by catalytic reaction is due to the fact that the gas permeable constriction plates, upon which the fluidized beds rest and through which the fluidizing gases pass, become rapidly clogged with a scale formed by alumina particles which have apparently been cemented together by condensed catalyst particles. The scale may also include depositions of pure catalyst. The result is that gas flow through the reactor is haphazard and may even stop entirely thus necessitating shutdown for cleanout.

Thus, we have discovered that such clogging, which occurs in the constriction plates of the beds through which the gases exiting from the calcining chamber pass, is apparently caused by catalyst which has been vaporized, or possibly only softened, in the calcining bed then entrained in the gas and subsequently condensed on the constriction plates through which such gases pass thereby eventually closing the gas passages.

It is a primary object of this invention to provide ways and means by which the fluidized solids technique may be successfully employed to calcine alumina and to catalytically convert it to the alpha form.

A further object is the provision of ways and means by which the deleterious plugging effects of catalyst deposits are avoided.

A further object is to provide ways and means which attain the foregoing objects and yet at the same time maintain the heat utilization efficiency of the above described prior system for producing gamma alumina.

Still another object is the provision of ways and means which accomplish the foregoing objects and in addition enable recovery and reuse of catalyst carried from the system in the entraining gas stream.

And a further object is the provision of ways and means by which control over the gas quantities and velocities in all beds of the reactor is simply effected by regulation of gases existing from only one of such beds.

In brief, the invention comprises the steps of calcining alumina hydrate in a first fluidized bed to yield gamma alumina, transferring the resulting hot gamma alumina solids to a second fluidized bed maintained as a catalytic conversion chamber functionally remote from the calcining bed and there producing alpha alumina by catalytic action of a suitable catalyst such as $AlF_3$, separately discharging gases from each of the beds, cooling gases exiting from the catalytic conversion bed to effect condensation and recovery of catalyst for reuse as well as recovery of sensible heat from the gases for subsequent use if desired, transferring alpha alumina from such conversion bed into a fluidized solids-cooling bed in which solids are cooled by contact with an incoming fluidizing gas stream thereby preheating said gas stream, and utilizing such preheated gas to fluidize solids in both the calcining bed and catalytic conversion bed by splitting said stream after exit from the cooling bed to furnish a portion thereof to the calcining bed and the remainder to the conversion bed.

By operating in the manner described, full advantage is taken of the heat recovery possibilities of multi-stage fluidization operations yet the catalyst is maintained entirely separate from the primary calcination zone. In this connection, there is desirably provided one or more solids preheating beds preceding the calcination bed and through which hot exit gases are passed to effect sensible heat transfer as described above in connection with the prior fluidized process for producing gamma alumina.

It is a feature of the present invention that splitting of the cooling bed gases to obtain proper proportioning thereof is simply accomplished by regulation of the flow of gases from the catalyst chamber after such gases have been cooled and the catalyst recovered therefrom. This is important because it enables use of relatively inexpensive valves and other controls at relatively low temperatures yet provides control over fluidization in both the calcining bed (and preheating beds if used) and the functionally remote catalytic conversion bed.

As previously noted, the present invention not only avoids plugging of constriction plates, but also enables recovery of catalyst for reuse. Such recovery, as described in more detail hereinafter, is accomplished by cooling catalytic bed exit gases to condense catalyst vapors to solids, and at the same time to reduce gas volume thus concomitantly reducing gas velocity whereby entrained catalyst particles are rendered more readily separable.

Further and more specific objects and advantages of the invention will become apparent from a perusal of the following description in connection with the appended drawing, it being understood that such description is offered for purposes of illustration only and is not to be taken as limiting the invention, the scope of which is defined by the appended claims and equivalents thereof, rather than by the description preceding them.

In the embodiment illustrated there is shown a reactor, generally designated R, which comprises a main cylinder made up from an outer shell 10 lined with refractory material 11 and having a top 13 equipped with a gas outlet conduit 14. The reactor is divided by transverse gas permeable constriction plates 16, 17 and 18 into superimposed compartments 19, 20 and 21, respectively, in which there is respectively contained fluidized beds 22, 23 and 24 supported on such plates. A solid bottom plate 26 is provided spaced below the lower constriction plate 18 in such a manner that a windbox 27 is defined into which fluidizing gas is supplied by a suitable gas supply conduit 28. In the embodiment illustrated, fluidizing gas is supplied from a second reactor R' which serves as a cooling chamber for material catalytically converted in an upper bed 31 of such second reactor R' as more fully described below.

Hydrated alumina to be calcined is supplied into the upper bed 22 of the first reactor via a suitable valved conduit 32 and is preheated by absorption of sensible heat from uprising gases. Preheated solids overflow via a conventional overflow conduit 33 into a second preheating bed 23 whence they are discharged via a further overflow conduit 34 into the lower bed 24. In such lower bed solids are heated to a calcining temperature in the range from 1600° F. to 2000° F. by means of fuel supplied by fuel supply gun 35 and combusted in the bed.

This results in conversion of the alumina to the gamma form which is overflowed via a conduit 36 through a suitably insulated fluidized seal valve 37 to which fluidization, preferably preheated, is supplied via valved conduit 37', thence through a further conduit 38 into catalytic conversion bed 31 which, as noted above, is the upper bed of second reactor R'.

In such catalytic reaction bed the still hot gamma alumina is contacted with a catalyst supplied via suitable supply conduit 39, heat for such catalytic conversion being supplied as sensible heat of the solids. Preheated gases uprising from lower chamber 41 of reactor R' minimize any cooling which might occur if cold fluidizing gases were employed. In chamber 41, product solids are cooled in fluidized bed 42 by upward passage of gases supplied via valved conduit 43 through windbox 44 thence upwardly through apertured constriction plate 46 as described in connection with the first reactor R. In this connection, it will be noted that after catalytic conversion of solids has been completed in bed 31, such solids are transferred via an overflow conduit 47 into cooling bed 42. After cooling in bed 42 product solids are discharged via a suitable discharge conduit 48 into a product receptacle 49 whence they are transferred to further process.

Gases exiting from reactor R pass through conduit 14 thence into a cyclone 51 or other dust diminishing station wherein entrained solids are separated, dust-free gases being discharged via conduit 52 while separated solids are transferred via conduit 53 to pass either through valved conduit 54 for return to calcining bed 24 of the first reactor or through alternate valved conduit 56 directly into catalytic conversion bed 31 of the second reactor.

Gases exiting from the second reactor R' contain entrained product alpha alumina solids as well as extremely fine catalytic solids and catalyst vapor. Such gases pass via a suitably insulated conduit 57 into a cyclone 58, also insulated, where entrained product solids are separated and transferred via a tailpipe 59 through a fluidized sealing valve 61, to which fluidizing gas is supplied via a valved conduit 61', for final distribution as product via conduit 62. Gases from cyclone 58, now substantially free from the alumina product solids, pass via a suitably insulated conduit 63 into a heat exchanger 64 where they contact cooling plates 66, cooled by means of a coolant introduced through conduit 67 and discharged through conduit 68. A suitable scraper, not shown, may be employed to keep plates or coils 66 free from undesirable buildup of catalyst particles.

In such heat exchanger or boiler 64 the gases are cooled thus lowering their temperature and reducing their volume with a concomitant reduction in velocity. This results in condensation of catalytic vapor and, aided by reduced gas velocity, disengagement of condensed particles along with the previously mentioned fine non-vaporized particles. Such disengaged catalyst particles settle out in hopper section 69 of the heat exchanger while cooled gases discharge via a conduit 72 which is valved as at 71 for a purpose to be more fully explained hereinafter. Catalyst particles collected in hopper 69 are discharged via a valved conduit 73 into a storage hopper 74 from which they may be controllably re-introduced, via a suitable valved conduit 76, into main catalyst supply conduit 39 for re-introduction into bed 31. At least some of the catalyst vapor, especially in the gases cooled by radiation, will condense as microscopic particles and remain in the gas stream as a haze-like formation. To recover such catalyst it is desirable to pass the gas through a further separator, such as an electrostatic precipitator. Such further cleaning of the gas also offers the advantage that the gas can be discharged to the atmosphere without danger of polluting the air.

In operation, catalytic bed 31 is maintained at a temperature in the range from 1600° F. to 2000° F. As previously discussed, this is suitably accomplished by sensible heat of calcined solids discharged from bed 24 in combination with preheated gases rising from cooling bed 42.

It will be noted that bed 31 in reactor R', as well as all three beds in the first reactor R are fluidized by preheated gases discharging from cooling bed 42. In order to attain proper distribution of gases to carry out fluidization of beds in both reactors it is necessary that the quantity of gas supplied to such beds be properly regulated. In accordance with the present invention, such regulation is achieved by means of a conventional hand valve 71 which operates to restrict the discharge of relatively cool gases from heat exchanger 64. This results in direct regulation of the quantity of gas passing through bed 31 and thus regulates the portion of gases from bed 42 available for supply to the first reactor R via windbox 27.

It will be noted that sensible heat of the fully calcined solids is fully utilized in the process, but at the same time gases emanating from catalytic conversion bed are kept out of contact with constriction plates of the first reactor thus obviating all difficulties attendant upon condensation of catalyst vapor in apertures of such plates. Moreover, the invention also accomplishes an important economy in reactants since catalyst particles are continually recovered for recycle and reuse.

Proper proportioning of gas flow from the cooling chamber through both the first reactor and the catalytic bed will be carried out in accordance with the requirements of the particular operating conditions in any given situation and will vary depending upon local conditions, the rate of feed, etc., all of which may be determined in accordance with known concepts of fluidization. In this connection, it is to be noted that in the alumina process described only minimum fluidizing gas velocity is required in bed 31 since no fuel combustion occurs and there is no oxygen requirement to be met. In the main reactor, however, there is a maximum gas velocity to be observed since the gamma alumina is prone to dusting. In general, a space rate of 1–1.5 feet per second in reactor R is maintained and about 0.3 foot per second in bed 31 of reactor R', a split of about 95% to 5%. Cooling bed 42 accommodates all (100%) of the fluidizing gas, but this presents no dusting problem since the alpha alumina is much less prone to dust losses than is the gamma form.

In connection with regulation of fluidizing gas, it is to be noted that supplemental control may be exercised by means of a suitable valve 77 on the gas discharge conduit 14 of the first reactor R.

In some cases it may be desirable to separately supply additional fluidizing gas either to the catalytic bed or to the first reactor R. This may be conveniently done in known fashion. Additionally, should there be insufficient heat available for carrying out the catalytic conversion in bed 31, fuel may be combusted in such bed to make up any deficiency or the bed may be fluidized with hot gas from a Dutch oven or other source of heat. However, the addition of heat will not usually be required since the catalytic conversion of alumina from gamma to alpha is an exothermic reaction and proceeds rapidly at temperatures of 1750° F. and higher. Hence, if the sensible heat of gamma solids is sufficient to promote such reaction no additional heat is required. As noted above, preheated gases uprising from the cooling bed aid in maintaining temperatures since they bring back into the system heat that would ordinarily be lost and do not exert a cooling effect to the degree that cold fluidizing gases would. If the reaction is vigorous enough, it might even be necessary to cool bed 31 in order to protect equipment. Controlled cooling can be conveniently accomplished by any known method such as coils or a water spray device.

We claim:
1. The process for calcining finely divided alumina solids to yield the alpha form of alumina, comprising establishing and maintaining a plurality of successive fluidized beds including a first bed maintained at a solids calcining temperature sufficient to form gamma alumina, a second bed maintained as a catalytic conversion bed, and a third bed maintained as a solids cooling bed; introducing alumina into the first bed and there calcining it to yield gamma alumina; introducing such gamma alumina and finely divided aluminum fluoride into the second bed and there converting gamma alumina to alpha alumina; transferring such alpha alumina into the third bed; fluidizing solids in the first and third beds by passing a stream of gas upwardly first through the third bed thence through the first bed thereby cooling solids in the third bed and preheating gas prior to its entry into the first bed; separately fluidizing solids in the second bed; and discharging gases exiting from said first bed and said second bed as separate streams.

2. A process for treating finely divided alumina solids to yield the alpha form of alumina, comprising establishing and maintaining a plurality of successive fluidized beds including a first bed maintained at an alumina calcining temperature enabling formation of gamma alumina, a second bed maintained as a catalytic conversion bed enabling conversion of gamma laumina to alpha alumina, and a third bed maintained as an alpha alumina solids cooling bed; calcining alumina solids in the first bed at elevated temperatures to yield hot gamma alumina solids, transferring the resulting hot gamma alumina solids to the second bed into contact therein with solid aluminum fluoride catalyst thereby effecting conversion of gamma alumina to alpha alumina concomitantly with the formation of aluminum fluoride vapors; transferring the resulting alpha alumina solids into the solids cooling bed; fluidizing solids in all of the beds by passing a stream of gas upwardly through the solids cooling bed thereby cooling solids therein and preheating the uprising gas, passing one portion of such preheated gas upwardly through the first bed to fluidize solids therein, passing a separate portion of such preheated gas upwardly through the second bed to separately fluidize solids therein and entrain aluminum fluoride vapors, discharging gases exiting from said first bed and said second bed as separate streams, and removing entrained aluminum fluoride from the gas stream exiting from the second bed by cooling such gas stream to effect condensation of the entrained aluminum fluoride.

References Cited in the file of this patent

UNITED STATES PATENTS

| | | |
|---|---|---|
| 1,036,454 | Childs | Aug. 20, 1912 |
| 2,683,077 | Lewis | July 6, 1954 |
| 2,750,258 | Jukkola | June 12, 1956 |